Patented Sept. 13, 1927.

1,642,018

UNITED STATES PATENT OFFICE.

HARRY L. FISHER, OF AKRON, OHIO, ASSIGNOR TO THE B. F. GOODRICH COMPANY, OF NEW YORK, N. Y., A CORPORATION OF NEW YORK.

RUBBER CONVERSION PRODUCT AND METHOD OF MAKING SAME.

No Drawing.  Application filed December 28, 1926. Serial No. 157,622.

This invention relates to methods of producing rubber conversion products by treating rubber with reagents capable of changing the chemical characteristics of the rubber, and to the products of such reaction.

The purpose of this invention is to provide rubber conversion products having properties adapting them for a number of useful purposes, such as the manufacture of molded goods, and, when dissolved in organic solvents, as bases for paints, waterproof coatings and adhesive cements.

The present invention is based upon the discovery that trichloracetic acid reacts with rubber under the influence of heat to produce rubber conversion products having distinctly different chemical and physical properties from the rubber from which these products are made. The reaction between the rubber and the trichloracetic acid may be effected by admixing the acid in rubber, and thereafter subjecting the admixture to heat at elevated temperatures for such time as may be necessary to complete the reaction between the ingredients of the mix. Experimentation also shows that in carrying out this process the presence of a phenol in the rubber-acid mix facilitates the reaction.

The following examples are hereinbelow given by way of illustration:

*Example 1.*—Mix into 100 parts by weight of a 5% solution of rubber in benzene 6 parts by weight of trichloracetic acid, thoroughly admixing the ingredients as by stirring. Place the admixture in a suitable receptacle under reflux and heat on a steam bath for an extended period, as for example for two days, in order to ensure the completion of the conversion reaction, then subject the reaction mixture to distillation to drive off the rubber solvent. This leaves a solid residue comprising the conversion product. In preparing or reworking this product for industrial purposes it is desirable to homogenize the mass, as by comminution, or by mastication, or by resolution in an organic solvent, and it may be washed free of residual acid and other water soluble impurities during or after the homogenizing process. This reworking of the product may be carried out without substantially changing the chemical characteristics of the thermoplastic product. Where the conversion product is to be used in solution, the liquid reaction mixture may in some cases be directly employed, in which case it is desirable to remove residual acid from the reaction mixture by washing or to neutralize the residual acid by treating with an alkali.

*Example 2.*—It has hereinabove been indicated that the presence of a phenol in the reaction mixture facilitates the conversion reaction. The following procedure is illustrative of this modification of the process: Into 100 parts by weight of a rubber solution, consisting of 5% of rubber dissolved in benzene, add 10 parts by weight of phenol and 6 parts by weight of trichloracetic acid, the ingredients being thoroughly admixed, as by stirring. This admixture when heated on a steam bath and the reaction product treated to isolate the solid conversion product in the manner described in the preceding example, yields a tough, thermoplastic material similar to that of the above Example 1. Other phenols than phenol itself may be employed in this process.

The purified conversion products of the above examples are tough, somewhat friable solid materials which are readily heat-plastic at ordinary molding temperatures. Analysis shows them to be chemically less unsaturated than rubber. These products are soluble in the common rubber solvents, such as benzene, gasoline, turpentine, etc., and are practically insoluble in alcohol, ether, acetone, aniline, water, and dilute acids and alkalies.

*Example 3.*—As an example of an embodiment of the process in which the reaction is carried out in a mass of crude rubber, take 100 parts by weight of rubber and admix therewith 20 parts of resorcinol and 20 parts of trichloracetic acid. Place the admixed batch in a vulcanization press or oven maintained at 324° F. for 20 hours, more or less, or until such time as the conversion action is complete. The resulting product is a hard very tough material which is practically insoluble in the common rubber solvents.

While several specific examples have been given in this specification, it will be obvious to the rubber technologist that various modifications in the proportions of the ingredients specified and in the time and temperature of carrying out the conversion reactions may be employed without departing from the principles of this invention.

I claim:

1. The method of treating rubber which comprises admixing trichloracetic acid with rubber, and heating the mix under conditions causing the rubber to be changed to a thermoplastic product.

2. The method of treating rubber which comprises admixing with rubber trichloracetic acid, heating the mix, and reworking the resulting product for industrial use.

3. The method of preparing rubber conversion products which comprises treating rubber at elevated temperatures with trichloracetic acid.

4. The method of preparing rubber conversion products which comprises admixing with rubber a phenol and trichloracetic acid and heating the mix.

5. The method of preparing rubber conversion products which comprises admixing trichloracetic acid into rubber in solution and heating the mix.

6. The method of preparing rubber conversion products which comprises admixing with rubber in solution a phenol and trichloracetic acid, and heating the mix.

7. A composition of matter comprising the product of the reaction, under the influence of heat, of rubber and trichloracetic acid.

8. A composition of matter comprising the product of the reaction, under the influence of heat, of trichloracetic acid, a phenol, and rubber.

In witness whereof I have hereunto set my hand this 20th day of November, 1926.

HARRY L. FISHER.